United States Patent [19]

Mathieu

[11] 4,291,356
[45] Sep. 22, 1981

[54] APPARATUS FOR ANALYZING A PHYSICAL QUANTITY

[75] Inventor: Serge Mathieu, Ste-Foy, Canada

[73] Assignee: h.o.p. Consulab Inc., Quebec, Canada

[21] Appl. No.: 63,093

[22] Filed: Aug. 2, 1979

[51] Int. Cl.³ .............................................. H02H 3/26
[52] U.S. Cl. ......................................... 361/87; 361/93; 361/187; 340/661; 340/664; 307/360
[58] Field of Search ...................... 361/90, 86, 87, 88, 361/187, 93, 161, 162; 307/351, 360; 340/661, 660, 662, 663, 664; 328/146, 147; 73/259 R, 259 C

[56] References Cited

U.S. PATENT DOCUMENTS

| | | | |
|---|---|---|---|
| 3,316,423 | 4/1967 | Hull | 361/187 X |
| 3,364,470 | 1/1968 | Thompson | 361/187 X |
| 3,582,665 | 6/1971 | Prozeller | 307/360 X |
| 3,787,735 | 1/1974 | DeWitte et al. | 307/360 X |
| 3,851,259 | 11/1974 | Porawski | 307/360 X |
| 4,006,387 | 2/1977 | Hudak | 361/87 |
| 4,157,509 | 6/1979 | Zielinski | 307/360 X |

*Primary Examiner*—Patrick R. Salce
*Attorney, Agent, or Firm*—Cushman, Darby & Cushman

[57] ABSTRACT

The disclosure herein describes an apparatus for analyzing a physical quantity, such as current, and for providing an indication of this quantity to an actuating element, for example a relay; a value of the physical quantity is compared to two preadjusted reference points and, as a result of this comparison, the actuating element is either energized, de-energized or remains unchanged; the two reference points are entirely independent from one another and either one can be made greater than the other; a particular application for this invention is for actuating a current relay.

5 Claims, 4 Drawing Figures

| J | K | L | |
|---|---|---|---|
| 0 | 1 | 0 | = OFF |
| 0 | 0 | X | = NO CHANGE |
| 1 | 0 | 1 | = ON |

APPARATUS FOR ANALYZING A PHYSICAL QUANTITY

FIELD OF THE INVENTION

The present invention pertains to an apparatus for analyzing a physical quantity and for providing an indication of this quantity to an actuating element.

BACKGROUND OF THE INVENTION

Current relays, for example, operate depending on the value of measured current. Most of these relays only include a single adjustable reference point such that when the measured current exceeds this reference point, the relay operates. There exists, on the other hand, numerous applications where it is necessary to have two adjustable reference points, for example, in systems that have a counter-reaction loop.

OBJECTS OF THE INVENTION

It is an object of the present invention to provide an apparatus which provides an indication to an actuating element, which includes two adjustment levels, one of which determines the value at which the actuating element is to be energized, while the other determines the value at which the actuating element is to be de-energized. This is achieved by providing two adjustable reference points that are entirely independent of one another; indeed, not only are they independent of one another but either one can be made greater than the other.

It is also an object of the present invention to provide a double adjustment apparatus for controlling a current relay.

STATEMENT OF THE INVENTION

The present invention therefore relates, in its broadest aspect, to an apparatus for analyzing a physical quantity and for providing an indication of this quantity to an actuating element; the apparatus comprises: means providing an input signal representative of the physical quantity; double adjustment means defining a pair of predetermined reference points, a first of these points determining a first value of the physical quantity for which the actuating element is to be energized, while the other reference point determines a second value of the physical quantity for which the actuating element is to be de-energized; compensation means allowing either one of these two values to be greater than the other; means comparing the input signal to these two values; and means responsive to the compensation means and to the comparing means to provide an indication to the actuating element, the indication consisting of: energizing the actuating element, de-energizing the actuating element, or effecting no change to the state of the actuating element.

In one preferred form of the invention, the compensation means consist of a pair of OR EXCLUSIVE gates.

The scope of applicability of the present invention will become apparent from the detailed description given hereinafter; it should be understood, however, that the detailed description while indicating preferred embodiments of the invention is given by way of illustration only since various changes and modifications within the spirit and scope of the invention will become apparent to those skilled in the art.

DESCRIPTION OF PREFERRED EMBODIMENTS

Figure 2:
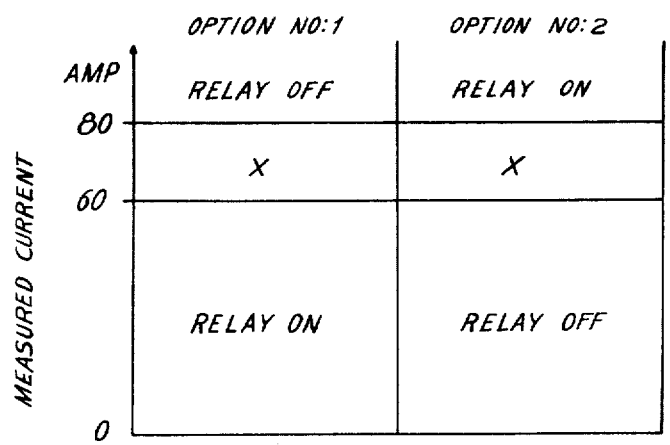
FIG. 2 is a diagram showing the two options available with the apparatus of the present invention.

For a proper understanding of the operation of the present invention, let us consider the following two options which may be desired on an actuating element, such as a current relay. In the first case, it is desired to have a current relay disconnect a load when the current measured exceeds 80 amperes and to reconnect this load when the current measured is less than 60 amperes. In the second case, it is desired to have the current relay disconnect a load when the current measured is less than 60 amperes and to reconnect this load when the current measured exceeds 80 amperes. FIG. 2 illustrates these two options, the letter X representing that no change is made to the relay, i.e. the relay remains unchanged, ON or OFF.

From the above example, it is therefore necessary for the apparatus to include two adjustment levels defining a first reference point for which the relay must be energized and a second reference point for which the relay must be de-energized. The comparison between the current measured on a line and the two reference points determines the action to be carried out by the relay. However, there are two possibilities: indeed, the relay must be energized either when the measured current is below these reference points (option 1) or when the measured current is above the reference points (option 2), and vice versa when the relay is to be de-energized.

Figure 1:
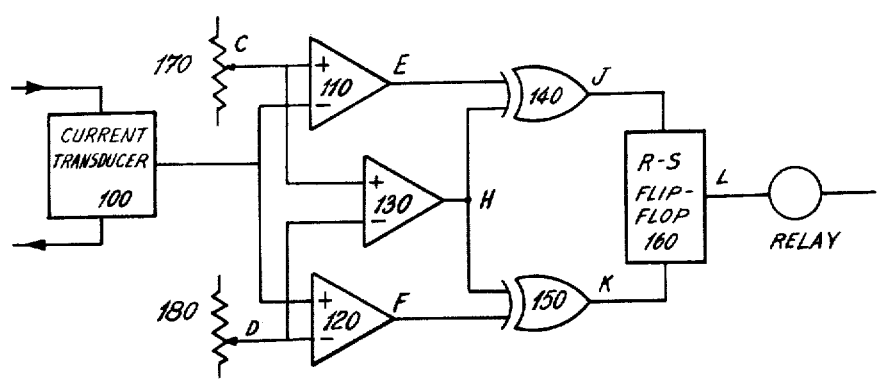
FIG. 1 is a block diagram of a circuit constructed in accordance with the present invention and particularly adapted for connection to a current relay.
Figures 3, 4:
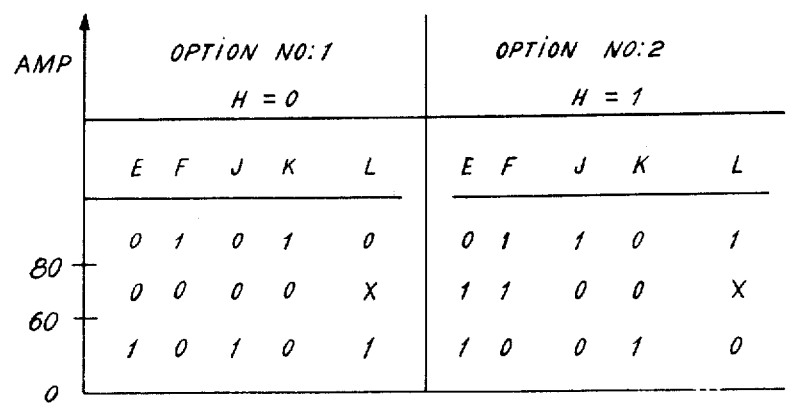
FIG. 3 is a logic table giving the input and output signals at the bistable means used in the present invention.
FIG. 4 is a logic table giving the various signals for the two options at various points of the circuit diagram shown in FIG. 1.

Referring to FIG. 1 of the drawings, current I of the line is measured by means of the current transducer 100 providing, at the output thereof, a continuous voltage B having a value which is proportional to the measured current. Voltage B is fed to comparators 110 and 120 and is compared with two reference voltages C and D which are obtained from two potentiometers 170 and 180 and which are respectively representative of the current for which it is desired to energize the relay and the current for which it is desired to de-energize the relay. The result of this comparison is represented by two logic levels E and F which would normally be fed to actuate a R-S flip-flop 160. However, such circuitry is only capable of carrying out one of the two options of FIG. 2. However, in order to perform the other option, the outputs of comparators 110 and 120 do not have the required polarity to actuate flip-flop 160. Hence, the polarity of outputs E and F of comparators 110 and 120 must be reversed. This is accomplished by compensation means 140 and 150, which preferably consist of two EXCLUSIVE OR gates. FIG. 4 illustrates the relationship existing between signals E, F and signals J, K for options 1 and 2. Signal H is obtained at the output of comparator 130 which evaluates the value of each reference point, and indicates which of the two options is present. The presence of the two EXCLUSIVE OR gates 140 and 150 therefore serves to evaluate whether or not signals E and F need to be reversed before being fed to the R-S flip-flop 160.

Let us assume that potentiometer 170 is the ON set point and is adjusted for 80 amperes while potentiometer 180 is the OFF set point and is adjusted for 60 amperes. This is therefore option 2 in FIG. 2 where it is desired to energize the relay for a value of the measured current above 80 amperes, say 85 amps. In this case the outputs of comparators 120 and 130 have the same binary signal output 1 while comparator 110 gives an output 0. The output of the EXCLUSIVE OR gates 140 is 1 while the output of the EXCLUSIVE OR gate 150 is 0. According to the FIG. 3, there is a change in the state of relay which is energized. The important feature of the present invention is the possibility of interchanging the role of points C and D. Hence, it is possible to make potentiometer 170 the OFF set point and potentiometer 180 the ON set point. This is option No. 1 where it is necessary to de-energize the relay above 80 amperes, say 85 amperes. Therefore, in the present case, the outputs E and H of comparators 110 and 130 are 0 while the output F of comparator 120 is 1. With E and H at 0, output J of the EXCLUSIVE OR gate 140 is at 0 while, with H at 0 and F at 1, the output of the EXCLUSIVE OR gate 150 is at 1. The inputs of flip-flop 160 being 0 and 1, the output L is at 0 and the relay is de-energized.

It should be mentioned that the apparatus described above can be used for measuring physical quantities other than current. Indeed, the transducer 100 of FIG. 1 can be replaced by other transducers for measuring other physical quantities such as temperature, pressure, distance, voltage, frequency, etc. Also, time delay circuits can be added to the circuitry to delay the energizing or de-energizing of the actuating element. Hence, the present invention can be refined and modified in various ways. It is therefore wished to have it understood that the present invention is not to be limited in scope except by the terms of the following claims.

The embodiments of the invention in which an exclusive property or privilege is claimed are defined as follows:

1. An apparatus for analyzing a physical quantity and for providing an indication of said quantity to an actuating element, comprising:
   (a) means providing an input signal representative of said physical quantity;
   (b) double adjustment means defining a pair of predetermined reference points, a first of said reference points determining a first value of said physical quantity for which said actuating element is to be energized, a second of said reference points determining a second value of said physical quantity for which said actuating element is to be de-energized;
   (c) means comparing said input signal to said first and second values;
   (d) a pair of EXCLUSIVE OR gates connected to said comparing means, one of said gates producing a given signal when said element is to be energized and the other of said gates producing a given signal when said element is to be de-energized;
   (e) means responsive to said signals from said gates and said comparing means to provide an indication to said actuating element, said indication consisting of: energizing said actuating element, de-energizing said actuating element, or effecting no change to the state of said actuating element.

2. An apparatus for analyzing a physical quantity and for providing an indication of said quantity to a relay, comprising:
   (a) transducer means providing an input signal representative of said physical quantity;
   (b) potentiometer means defining two predetermined reference points, a first of said reference points determining a first value of said physical quantity for which said relay is to be energized, the second of said reference points determining a second value of said physical quantity for which said relay is to be de-energized;
   (c) a pair of comparator means each comparing said input signal with a respective one of said first and second values;
   (d) compensation means at the output of said two comparator means;
   (e) third comparator means comparing said reference points and indicating whether compensation is required;
   (f) bistable means responsive to said compensation means and said comparator means to provide an indication to said relay, said indication including: energizing said relay, de-energizing said relay, or effecting no change to the state of said relay.

3. An apparatus as defined in claim 2, wherein said compensation means consist of a pair of EXCLUSIVE OR gates.

4. An apparatus as defined in claim 1 or claim 2, wherein said physical quantity is current.

5. An apparatus as in claim 2, wherein said compensation means includes:
   a pair of EXCLUSIVE OR gates connected to said pair of comparator means, one of said gates producing a given signal when said relay is to be energized and the other of said gates producing a given signal when said element is to be de-energized.

* * * * *